(12) United States Patent
Raux

(10) Patent No.: US 9,659,003 B2
(45) Date of Patent: May 23, 2017

(54) HYBRID LANGUAGE PROCESSING

(71) Applicant: LENOVO (Singapore) PTE, LTD., New Tech Park (SG)

(72) Inventor: Antoine Roland Raux, Cupertino, CA (US)

(73) Assignee: Lenovo (Singapore) PTE. LTD., New Tech Park (SG)

( * ) Notice: Subject to any disclaimer, the term of this patent is extended or adjusted under 35 U.S.C. 154(b) by 0 days.

(21) Appl. No.: 14/226,659

(22) Filed: Mar. 26, 2014

(65) Prior Publication Data

US 2015/0278193 A1    Oct. 1, 2015

(51) Int. Cl.
*G06F 9/44*      (2006.01)
*G06F 17/27*     (2006.01)
*G06F 17/28*     (2006.01)

(52) U.S. Cl.
CPC .......... *G06F 17/2765* (2013.01); *G06F 17/28* (2013.01)

(58) Field of Classification Search
None
See application file for complete search history.

(56) References Cited

U.S. PATENT DOCUMENTS

| | | | | |
|---|---|---|---|---|
| 5,805,832 A * | 9/1998 | Brown et al. | ...................... | 711/1 |
| 6,959,279 B1 * | 10/2005 | Jackson | ................ | G10L 13/047 365/45 |
| 6,999,932 B1 * | 2/2006 | Zhou | ..................... | G06F 17/275 704/235 |
| 7,103,154 B1 * | 9/2006 | Cannon | ............... | H04M 1/6505 379/32.01 |
| 7,318,221 B2 * | 1/2008 | Lin | ............................... | 717/143 |
| 8,583,418 B2 * | 11/2013 | Silverman | ............... | G10L 13/08 704/1 |
| 8,615,274 B2 * | 12/2013 | Jung | .................. | G01C 21/3664 340/436 |
| 8,694,904 B2 * | 4/2014 | Verlaan | ............... | G06F 17/2247 715/770 |
| 8,918,449 B2 * | 12/2014 | Patel | ...................... | G06F 9/547 709/202 |
| 9,058,805 B2 * | 6/2015 | Aleksic et al. | | |
| 9,247,174 B2 * | 1/2016 | Sirpal | ...................... | H04N 5/44 |
| 9,253,609 B2 * | 2/2016 | Hosier, Jr. | ............... | H04W 4/08 |
| 2002/0016712 A1 * | 2/2002 | Geurts | .................... | G10L 15/22 704/275 |
| 2004/0044422 A1 * | 3/2004 | Fux | ........................ | G06F 3/018 700/17 |
| 2005/0005266 A1 * | 1/2005 | Datig | ........................... | 717/136 |
| 2011/0054900 A1 * | 3/2011 | Phillips et al. | ............... | 704/235 |
| 2013/0111348 A1 * | 5/2013 | Gruber et al. | ................ | 715/727 |

(Continued)

OTHER PUBLICATIONS

Nuance, "How to create a custom macro in Dictate", published Oct. 27, 2010, p. 1, [online][retrieved on Sep. 12, 2016]. Retgrieved from <<http://nuance.custhelp.com/app/answers/detail/a_id/6140/~/how-to-create-a-custom-macro-in-dictate>>.*

*Primary Examiner* — Evral E Bodden
(74) *Attorney, Agent, or Firm* — Kunzier Law Group

(57) ABSTRACT

For hybrid language processing, a method is disclosed that includes identifying, by use of a processor, one or more user specific terms in a user generated portion of text, modifying the portion of text by replacing one or more of the user specific terms with general tokens, and converting the modified portion of text to one or more commands to be executed by the processor.

17 Claims, 8 Drawing Sheets

(56) References Cited

U.S. PATENT DOCUMENTS

2013/0166279 A1* 6/2013 Dines ............... G10L 15/02
704/8
2015/0081279 A1* 3/2015 Suleman et al. ............. 704/9

* cited by examiner

500

TEXT

How do I get from Bill's House to Oracle Arena?
510      502

MODIFIED TEXT

How do I get from 7326 Island Drive, Menlo Park, CA to Oracle Arena?
512

COMMAND

DIRECTIONS;   514
7326 Island Drive, Menlo Park, CA;
7000 Coliseum Way, Oakland, CA.

EXECUTE

MAPPING APPLICATION;   516
FROM: 7326 Island Drive, Menlo Park, CA;
TO: Oracle Arena

FIG. 5

HYBRID LANGUAGE PROCESSING

BACKGROUND

Field

The subject matter disclosed herein relates to electronically interpreting user commands and more particularly relates to hybrid language processing.

Description of the Related Art

Computing devices typically include natural language processing capabilities. This ability to electronically interpret user commands provides enhanced ability to operate the computing device.

However, in many circumstances, the interpretation of terms included in the natural language may depend on where the term is used. In some examples, specific terms may have one meaning to a specific user, but may not have significant meaning in a general sense. For example, "Bill's House" may have specific meaning to a computing device with a contact list that includes "Bill," but may not have meaning away from the local computing device. For example, without local information regarding the identity of "Bill," a general language processor may not be able to determine who or where Bill is.

In another example, a command such as "call Mary" may be interpreted locally to be a command to call a contact with a name "Mary." In other examples, a natural language command may be more complex. For example, an inquiry such as "How do I get from Bill's House to Oracle Arena?" Such a command may not be interpreted locally because "Oracle Arena" may not be known at the local computing device. Such a command may not be interpreted generally because "Bill's House" may not be known to a general language processor.

BRIEF SUMMARY

An apparatus for hybrid language processing is disclosed. In one embodiment, the apparatus includes a processor, and a memory that stores code executable by the processor. In one embodiment, the code includes code that identifies one or more user specific terms in a user generated portion of text, code that modifies the portion of text by replacing one or more of the user specific terms with general tokens, and code that converts the modified portion of text to one or more commands to be executed by the processor. A method and computer program product also perform the functions of the apparatus.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 5 is a schematic illustration depicting one scenario in accordance with the present disclosure;

DETAILED DESCRIPTION

Figure 1:
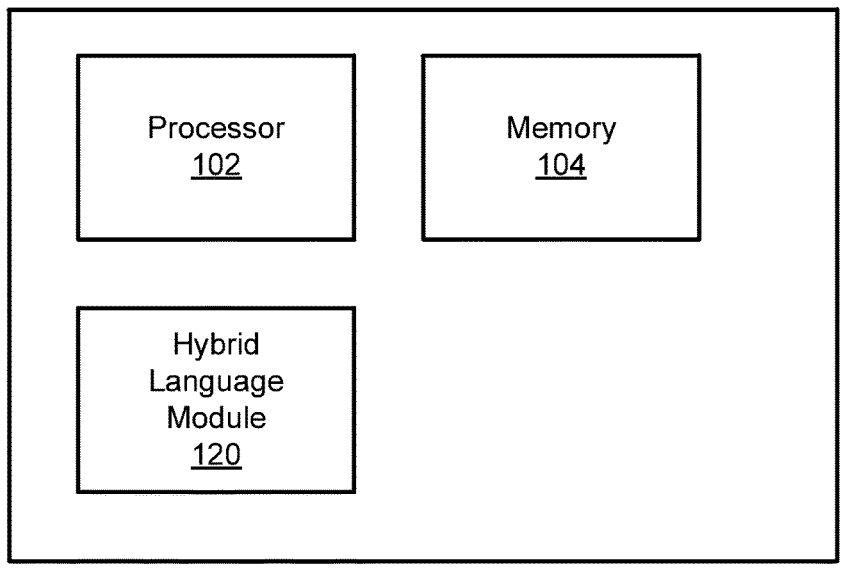
FIG. 1 is a schematic block diagram illustrating one embodiment of an apparatus in accordance with the present disclosure.

As will be appreciated by one skilled in the art, aspects of the embodiments may be embodied as a system, method or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, comprise one or more physical or logical blocks of executable code which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be written in any combination of one or more programming languages, including an object oriented programming language such as Java, Smalltalk, C++ or the like and conventional procedural programming languages, such as the "C" programming language or similar programming languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. These code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which comprises one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 is a schematic block diagram illustrating one embodiment 100 of an apparatus in accordance with the present disclosure. In one embodiment, the apparatus includes a processor 102, a memory 104, and a hybrid language module 120.

In one embodiment, the processor 102 may include any type of microprocessor capable of executing executable code. The processor 102 may include one or more cores, dies, chips, or the like. The processor 102 may implement a reduced instruction set, or a complex instruction set, or other, or the like. Of course, one skilled in the art may appreciate other types of configurations of processors and this disclosure is meant to include all such processors.

In one embodiment, the apparatus 100 may include a memory 104 that stores code executable by the processor. The memory 104 may include volatile memory, non-volatile memory, or other, or the like. The memory 104, may include a wide variety of storage memory types, such as, but not limited to, read only memory, random access memory, solid state memory, or other, or the like, as one skilled in the art may appreciate.

In one embodiment, the apparatus 100 may include a hybrid language module 120. In one embodiment, the hybrid language module 120 may include code that identifies one or more user specific terms in a user generated portion of text. In one embodiment, the user generated portion of text includes results of a speech to text processor. In one example, the apparatus 100 may receive an audio signal that represents the portion of text. The apparatus 100 may convert the audio signal to the portion of text. In another embodiment, the hybrid language module 120 may receive the portion of text from a remote computing device, or other, or the like. Of course, one skilled in the art may appreciate a wide variety of different ways in which speech from a user may be converted to text. In another embodiment, the user generated portion of text may include a user entering text into the apparatus 100 using a keyboard, or other text input device. Therefore, user generated may include any way that a user may cause a portion of text to be generated.

In one embodiment, the hybrid language module 120 may parse the text in order to determine sentences. The hybrid language module 120 may analyze the sentences to determine subjects, objects, verbs, or the like, as one skilled in the art may appreciate. In one embodiment, an object, or subject of a sentence may include more than one term. For example, the terms "Henry Wilson" may correlate to a single token. In another embodiment, each word in the sentence may be an individual token.

In another embodiment, the hybrid language module 120 may parse the text into a plurality of tokens. As previously described, the tokens may include more than one term. The tokens may be compared with user specific terms to determine if any of the tokens have user specific meaning. In one example, the hybrid language module 120 may compare the tokens to contacts in a contact list at the apparatus. In response to a token matching an entry in a list of contacts, the hybrid language module 120 may identify the token as having a user specific meaning. In other examples, the hybrid language module 120 may look up tokens in a local library of terms.

In one embodiment, the local library of terms may include users in a contact list, searched terms at a web browser, names of installed applications, or other keywords that may have local significance or meaning.

In one embodiment, the hybrid language module 120 may replace user specific terms with general tokens that are general terms. User specific terms may include terms that have local meaning beyond a general meaning. User specific terms may include terms that may be translated to general language that may be understood by a general language processor. For example, a general language processor may not be able to resolve "Mike's House," but may be able to resolve a complete address for "Mike's House." Therefore, the user specific term may include 'Mike's House," whereas the general tokens may be general language that includes the complete address for "Mike's House."

In one example, the hybrid language module 120 may have identified a user specific token as "Mike's House." The hybrid language module 120 may replace "Mike's House" with general tokens that include a complete address based on an entry in a contact list. For example, the hybrid language module 120 may replace "Mike's House" with "543 East 899 North, Salt Lake City, Utah."

In another example, the hybrid language module 120 may replace "Mike's House" with a general token that is a template token. For example, the hybrid language module 120 may replace "Mike's House" with the template token "LOCATION." Of course, other template tokens may be used to represent user specific terms, such as, but not limited to, PRODUCT, ACTION, COMMAND, BUSINESS, PERSON, or other, or the like. As used herein, a template token may be capitalized so as to indicate that the term is a template token.

In one example, the portion of text may include "recommend the ThinkPad Tablet to Jane." The hybrid language module 120 may identify "Jane" as a user specific term, and may replace "Jane" with a general token that may be a template token, such as, "PERSON." The hybrid language module 120 may replace "Jane" with "PERSON" resulting in the modified portion of text including "recommend the ThinkPad Tablet to PERSON." In one embodiment, a general language processor may be able to interpret "recommend the ThinkPad Tablet to PERSON," while a general language processor may not be able to interpret "recommend the ThinkPad Tablet to Jane."

Furthermore, the hybrid language module 120 may replace "Thinkpad Tablet" to "PRODUCT" resulting in the modified portion of text including "recommend the PRODUCT to PERSON." The hybrid language processor may convert the portion of text to a "recommend" command. In one example, the recommend command may include an email, a telephone call, a text message, a social networking post, a post on another server, or the like. Therefore, the command "recommend PRODUCT to PERSON" may include emailing recommending text regarding the PRODUCT to the PERSON.

In this example, the hybrid language module 120 may replace the template tokens (PRODUCT, PERSON) with general information. For example, the hybrid language module 120 may replace "PRODUCT" with the ThinkPad Tablet, and may replace "PERSON" with Jane's email. Therefore, a resulting command may include emailing recommending text regarding the ThinkPad Tablet to Jane's email.

In another example, the hybrid language module 120 may replace the user specific terms with general tokens that include general language. In a similar example, the hybrid language module 120 may replace the "Jane" token with general language that includes Jane's email before the general language processor converts the portion of text to a command. In one embodiment, the command may be executed by the processor 102.

In one embodiment, the hybrid language module 120 may further modify the portion of text by replacing one or more user specific terms with general language and template tokens. In one example, the hybrid language module 120 may generate a structure that includes the portion of text, the modified portion of text, the user specific terms, template tokens, or other related tokens, or the like.

For example, where the portion of text includes "Recommend my tablet to Bill," the hybrid language module 120 may modify the portion of text by replacing user specific terms (i.e. "my tablet" and/or "Bill"), with template tokens (i.e. "PRODUCT" and/or "PERSON"). The hybrid language module 120, may generate a structure that includes the portion of text before modifications, the modified portion of text, template tokens, general language, general tokens, or other related text, or other tokens, or the like. Therefore, the hybrid language module 120 may include any and/or all related text information in a logical structure to encapsulate the information.

For example, the hybrid language module 120 may generate a structure as follows:

```
{
    "text": "Recommend my PRODUCT to PERSON",
    "PRODUCT": {
        "maker": "Lenovo",
        "name": "ThinkPad Tablet"
    },
    "PERSON": {
        "name": "Bill Murray",
        "email": "bill@murray.com",
        "phone": "800-777-1234"
    }
}
```

In one example, the structure may include braces to logically identify corresponding fields. In other examples, the structure may be enclosed in braces, brackets, bars, or other symbols, or the like. In another example, various fields or values may be enclosed in tags as one skilled in the art may appreciate. In one example, the encapsulated structure may include hyper-text markup language, a script object notation, other notation, or the like. The structure may include a "text" field that may include the user generated portion of text. The "text" field may include a modified portion of text that may include template tokens, such as, but not limited to "PRODUCT," "PERSON," or other template tokens as described herein.

The structure may include a brace delineated field to encapsulate a user specific meaning for a template token. In one example, the structure may include a "PRODUCT" field. Encapsulated in the "PRODUCT" field may be product related information, such as, but not limited to, make, model, count, version, price, sales date, or the like. In another example, the structure may include a delineated "PERSON" field. The "PERSON" field, in one example, may include name, age, gender, race, religion, size, height, weight, hobbies, phone number, related usernames, email, address, or other identifying information, any combination of the foregoing, or the like. Of course, other template tokens may be used to represent other information, for example, template tokens may include, PLACE, LOCATION, TIME, PRODUCT, PERSON, DATE, APPLICATION, DEVICE, SOFTWARE, OPERATING SYSTEM, VERSION, or other, or the like. Therefore, in certain embodiments, the template tokens may represent any information relative to the general tokens, user specific meanings, or other, or the like.

The structure may encapsulate additional information to further describe the template tokens. For example, as depicted in the structure above, the hybrid language module 120 may generate a structure that includes identifying information for a PERSON, such as, but not limited to, a name, an email, a phone number, or the like. For example, the structure may include the PERSON's name, "Bill Murray," the PERSON's email, "bill@murray.com," and/or the PERSON's phone number, "800-777-1234," or other, or the like.

In one embodiment, the hybrid language module 120 may transmit the generated structure to a remote server 220 for conversion. The remote server 220 may be configured to read and/or decode the structure or the modified portion of text. The remote server may, construct an electronic command represented by the structure or modified portion of text. The hybrid language module 120 may receive the constructed command from the remote server.

In one embodiment, the apparatus 100 includes code that executes constructed commands in response to converting the modified portion. In another embodiment the hybrid language module 120 may forward one or more commands to an application for processing. The application may then execute the one or more commands.

Figure 2:
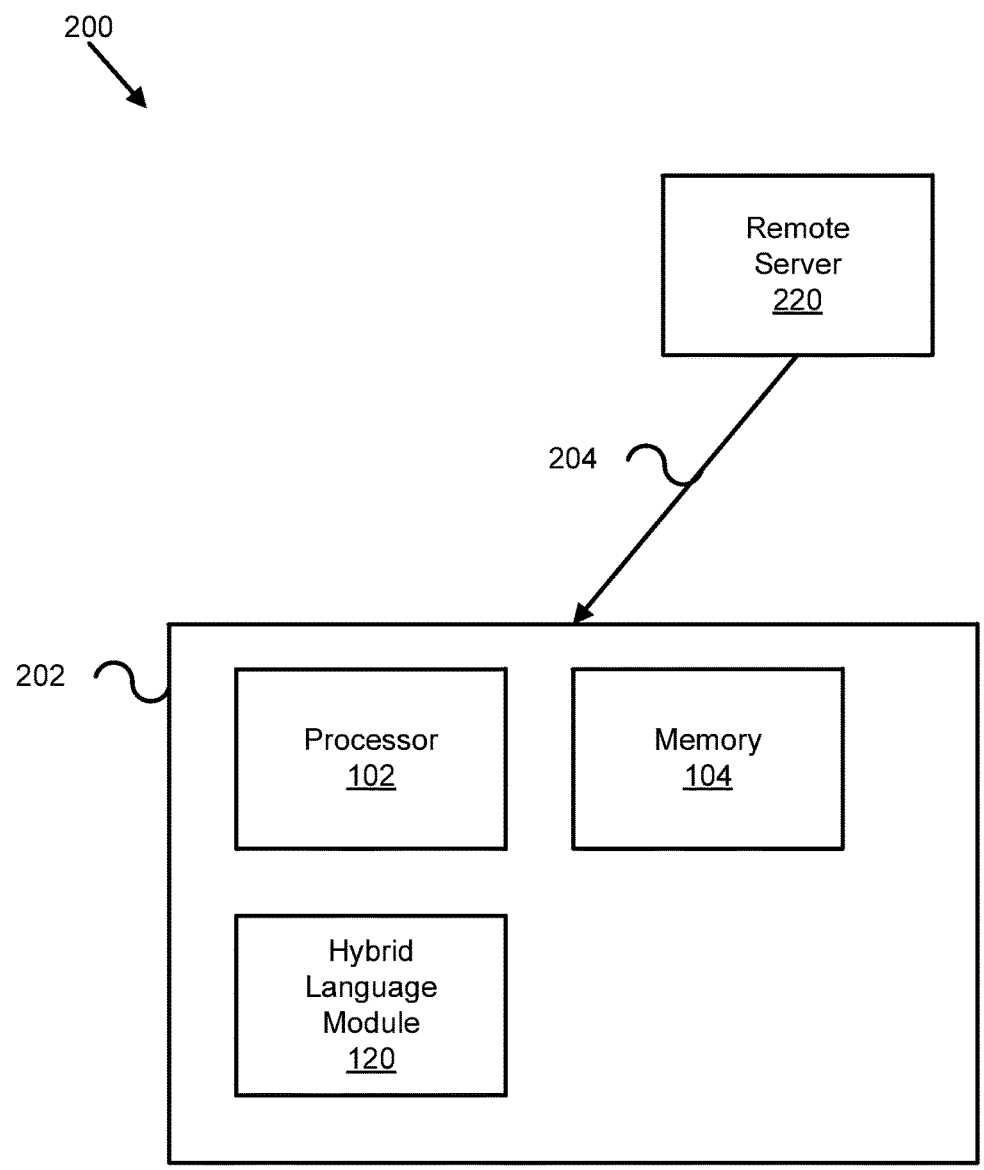
FIG. 2 is a schematic block diagram illustrating one embodiment of an apparatus in accordance with the present disclosure.

FIG. 2 is a schematic block diagram illustrating one embodiment of an apparatus 202 in accordance with the present disclosure. In one embodiment, the apparatus 202 may or may not be substantially similar to the apparatus 100 of FIG. 1.

In one embodiment, the apparatus 202 may communicate with a remote server 220 via a connection 204. The remote server 220 may be a computing device configured to convert a portion of text according to general language processing as one skilled in the art may appreciate. In another embodiment, the apparatus 202 may communicate with the remote server 220 via an application programming interface. For example, the hybrid language module 120 may transmit the portion of text to the remote server and may receive corresponding commands. The corresponding commands may be formatted in a wide variety of different formats as one skilled in the art may appreciate and this disclosure is not limited in this regard.

In one embodiment, the connection 204 may be a network connection. The network connection 204 may be wired or wireless, or other, or the like as one skilled in the art may appreciate. In another embodiment, the connection 204 may be a physical connection that implements a data transfer protocol.

In another embodiment, the hybrid language module 120 may transfer portions of text to the remote server 220 for conversion. In one embodiment, the remote server 220 may be configured to learn meanings of the user specific terms. For example, the remote server may be configured to know where "Bill's House" is. Therefore, in another embodiment, the hybrid language module 120 may request the remote server 220 to convert a portion of text that includes "Bill's House" to a command. This may be the case although, "Bill's House" may be insufficient for a general language processor to interpret. In another example, the remote server 220 may learn product names, people, actions, applications, commands, or other that may have user specific meanings, and the remote server 220 may convert a portion of text using both general language and learned user specific meanings.

Figure 3:
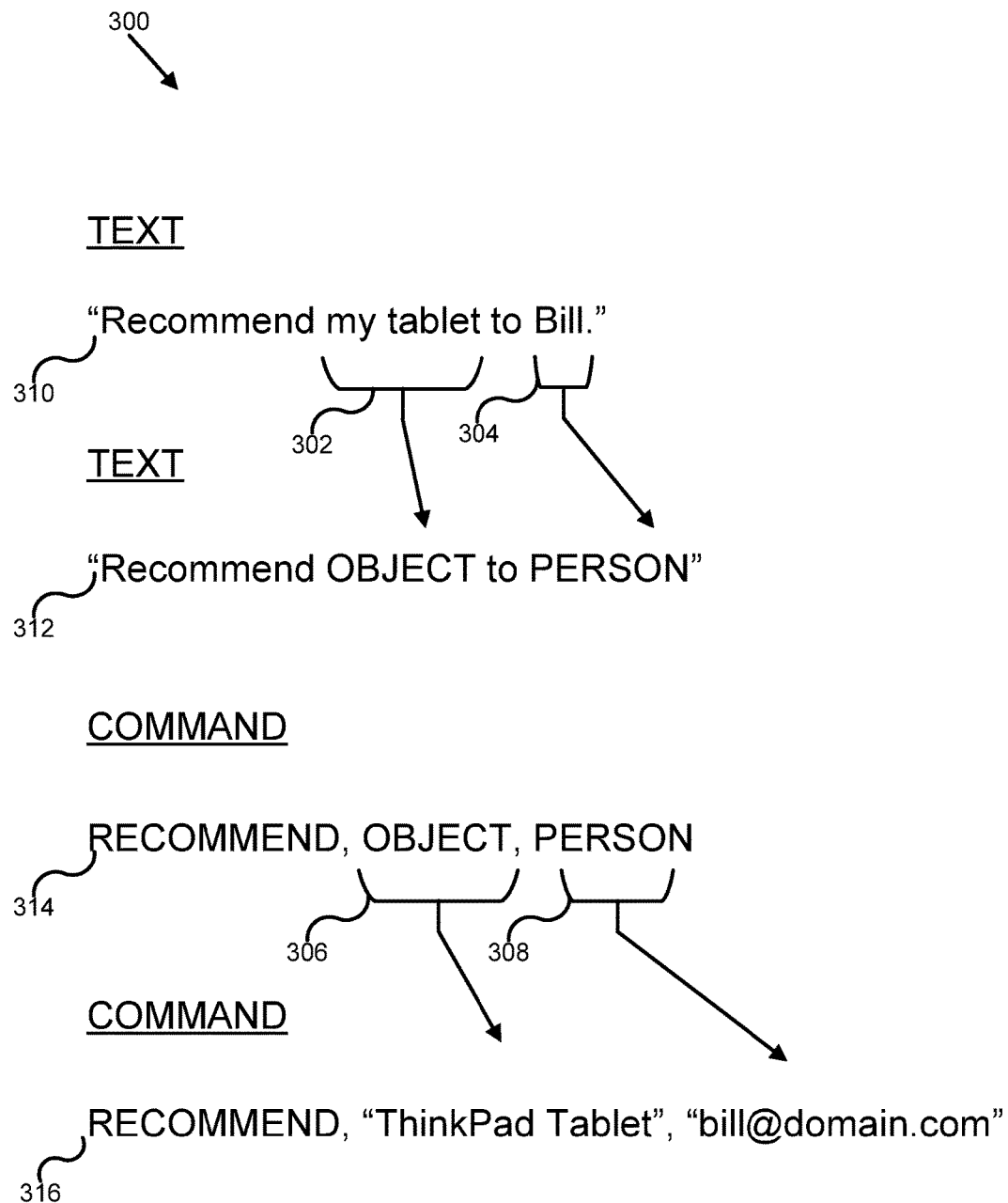
FIG. 3 is a schematic illustration depicting one scenario in accordance with the present disclosure.

FIG. 3 is a schematic illustration depicting one scenario 300 in accordance with the present disclosure. In one embodiment the hybrid language module 120 may receive text 310 that includes "Recommend my tablet to Bill." The hybrid language module 120 may determine that "my tablet" 302 is an OBJECT and "Bill" 304 is a PERSON. Therefore, the hybrid language module may replace the "my tablet" user specific term with a general token that is a template token ("OBJECT"), and may replace the user specific term "Bill" with a general token that is a template token ("PERSON"). The resulting modified text 312 may be "recommend OBJECT to PERSON." The "OBJECT" term and the "PERSON" term in the modified text 312 may be template tokens.

The hybrid language module 120 may then convert the modified text 312 to a command 314. In one example, the command may include recommending a product to a person. In one example, the "RECOMMEND" command may recommend a product by sending an message via an email. The recommend command may include an OBJECT to recommend, and a PERSON to whom a recommendation should be made. The hybrid language module 120 may replace the template tokens in the command 314 with associated general language.

Therefore, hybrid language module 120 may replace the "OBJECT" template token with "ThinkPad Tablet," and may replace the "PERSON" template token with general language for Bill's email, bill@domain.com. This may result in an executable command 316, such as a recommend command that emails recommending text regarding the user's tablet device to Bill.

Figure 4:
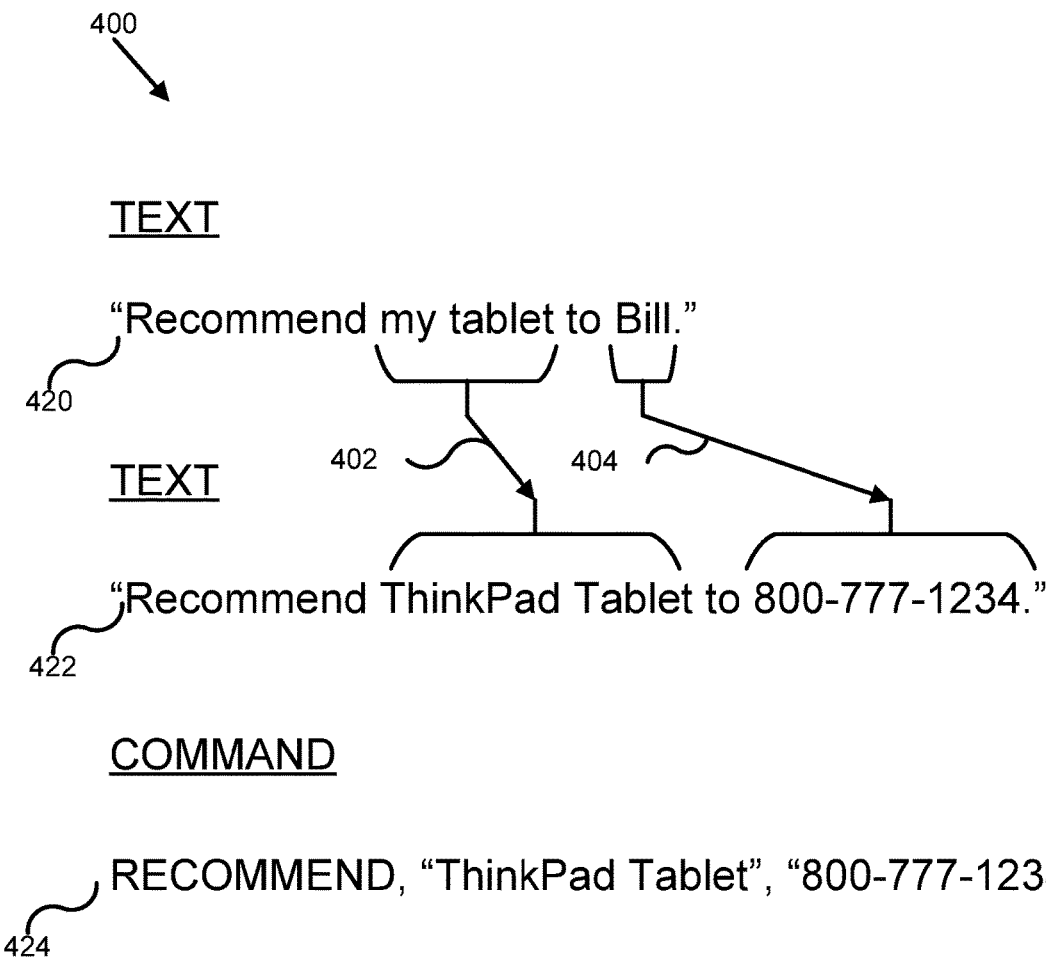
FIG. 4 is a schematic illustration depicting one scenario in accordance with the present disclosure.

FIG. 4 is a schematic illustration depicting one scenario in accordance with the present disclosure. In one embodiment the hybrid language module 120 may receive text 420 that includes "Recommend my tablet to Bill." The hybrid language module 120 may determine that "my tablet" 302 is a user specific term and "Bill" 304 is user specific term.

The hybrid language module may replace the "my tablet" user specific term with a general token that is general language that described the "my tablet." In one example, the hybrid language module may replace 402 "my tablet" with general language that described "my tablet," such as "ThinkPad Tablet". The hybrid language module may replace the "Bill" term with a general token that is general language. For example, the hybrid language module may replace 404 the "Bill" term with an email for Bill. Therefore, because an email may be interpreted by a general language processor, an email address may be general language. The resulting text 422 may include "Recommend a ThinkPad Tablet to bill@domain.com."

The hybrid language module 120 may then convert the modified text 422 to a command 424. In one example, the command may include recommending a product to a person. In one example, the "RECOMMEND" command may recommend a product by sending an message via an email. This may result in an executable command 424, such as a recommend command that emails recommending text regarding the user's tablet device to Bill.

In another embodiment, the hybrid language module 120 may transmit the modified portion of text to a remote server for conversion. Because the hybrid language module 120 replaced user specific terms to general tokens that include general language, the modified portion of text may then be converted by a general language processor, without knowledge of the user specific terms. Therefore, a remote service that may be a general language processor may interpret the modified portion of text and convert the modified portion of text to an executable command.

FIG. 5 is a schematic illustration depicting one scenario 500 in accordance with the present disclosure. In one embodiment the hybrid language module 120 may receive text 310 that includes "How do I get from Bill's House to Oracle Arena?" The hybrid language module 120 may determine that "Bill's House" has user specific meaning. The hybrid language module 120 may replace the "Bill's House" user specific term with general language that may be understood by a general language processor (that may not have sufficient information to interpret "Bill's House"). In one scenario, the hybrid language module 120 may replace 502 "Bill's House" with a complete address for "Bill's House," such as, "7326 Island Driver, Menlo Park, Calif." This replacement may result in a modified portion of text 512 that includes "How do I get from 7326 Island Drive, Menlo Park, Calif. to Oracle Arena?" This modified portion of text 512 may be accurately interpreted by a general language processor because there are no longer user specific terms in the modified portion of text 512.

In one embodiment, the hybrid language module 120 may replace other terms with general language that may be interpreted by a general language processor. In one example, the hybrid language module 120 may request a complete address for "Oracle Arena" from the remote server 220. The remote server 220 may return the address "7000 Coliseum Way, Oakland, Calif." In one embodiment, the hybrid language module 120 may replace "Oracle Arena" with "7000 Coliseum Way, Oakland, Calif." In another embodiment, the hybrid language module may generate a command represented by the modified portion of text 512.

In another embodiment, the hybrid language module 120 may interpret a command 514 from the modified text. The command 514 may include a DIRECTIONS command 514 that includes a TO location and a FROM location. In certain embodiments, the location may include a street address, a latitude and longitude, elevation, other coordinates, or the like, as one skilled in the art may appreciate.

In one embodiment, the hybrid language module 120 may convert the modified text to one or more commands that may be executed by a processor as described herein. The commands may also be forwarded to an application configured to execute the one or more commands. For example, the hybrid language module 120 may convert the modified text 512 to a command 514, and forward the command to a mapping application. The mapping application may construct a path between the FROM location and the TO location as one skilled in the art may appreciate.

Figure 6:
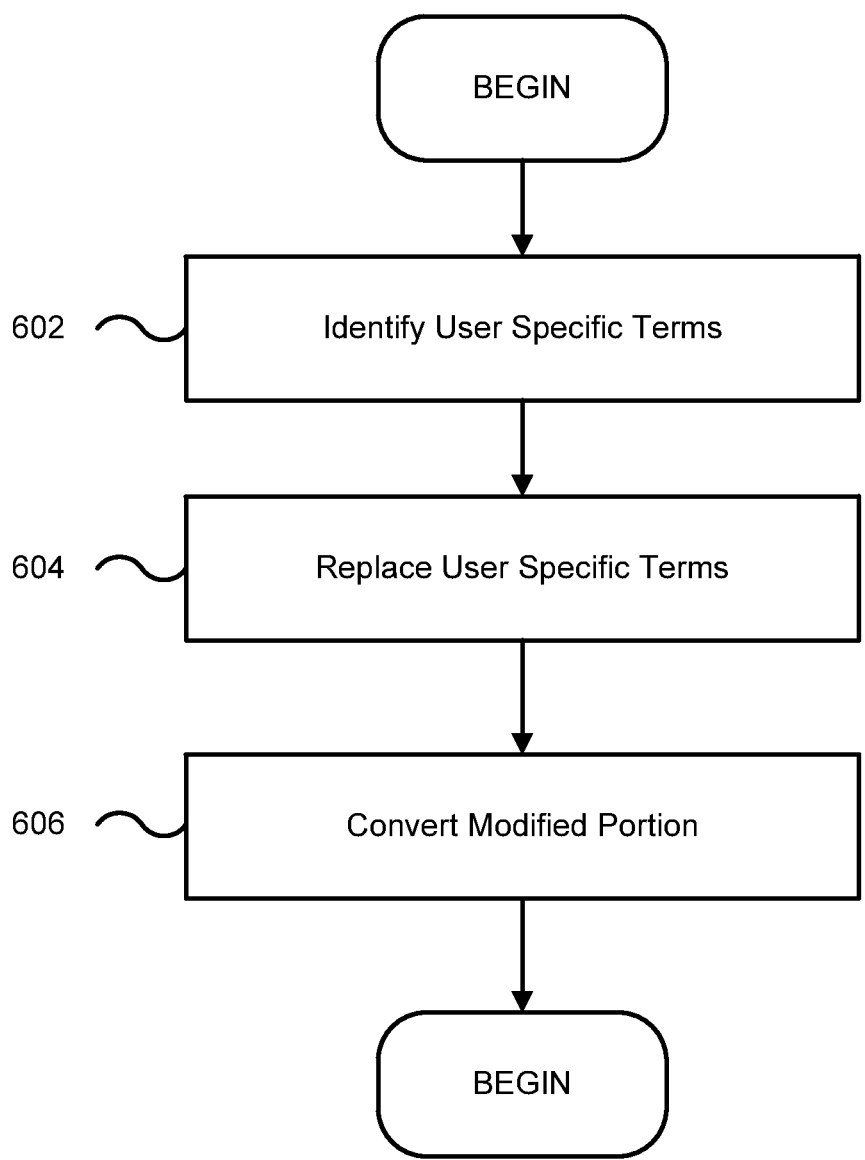
FIG. 6 is a schematic flow chart diagram illustrating one embodiment of a method in accordance with the present disclosure.

FIG. 6 is a schematic flow chart diagram illustrating one embodiment of a method 600 in accordance with the present disclosure. In one embodiment, the method 600 may begin and the hybrid language module 120 may identify 602 user specific terms in a user generated portion of text. The hybrid language module 120 may modify the portion of text by replacing 604 the user specific terms with general tokens. The general tokens may include template tokens and/or general language. The hybrid language module 120 may convert 606 the modified portion of text to one or more commands to be executed and the method 600 may end.

Figure 7:
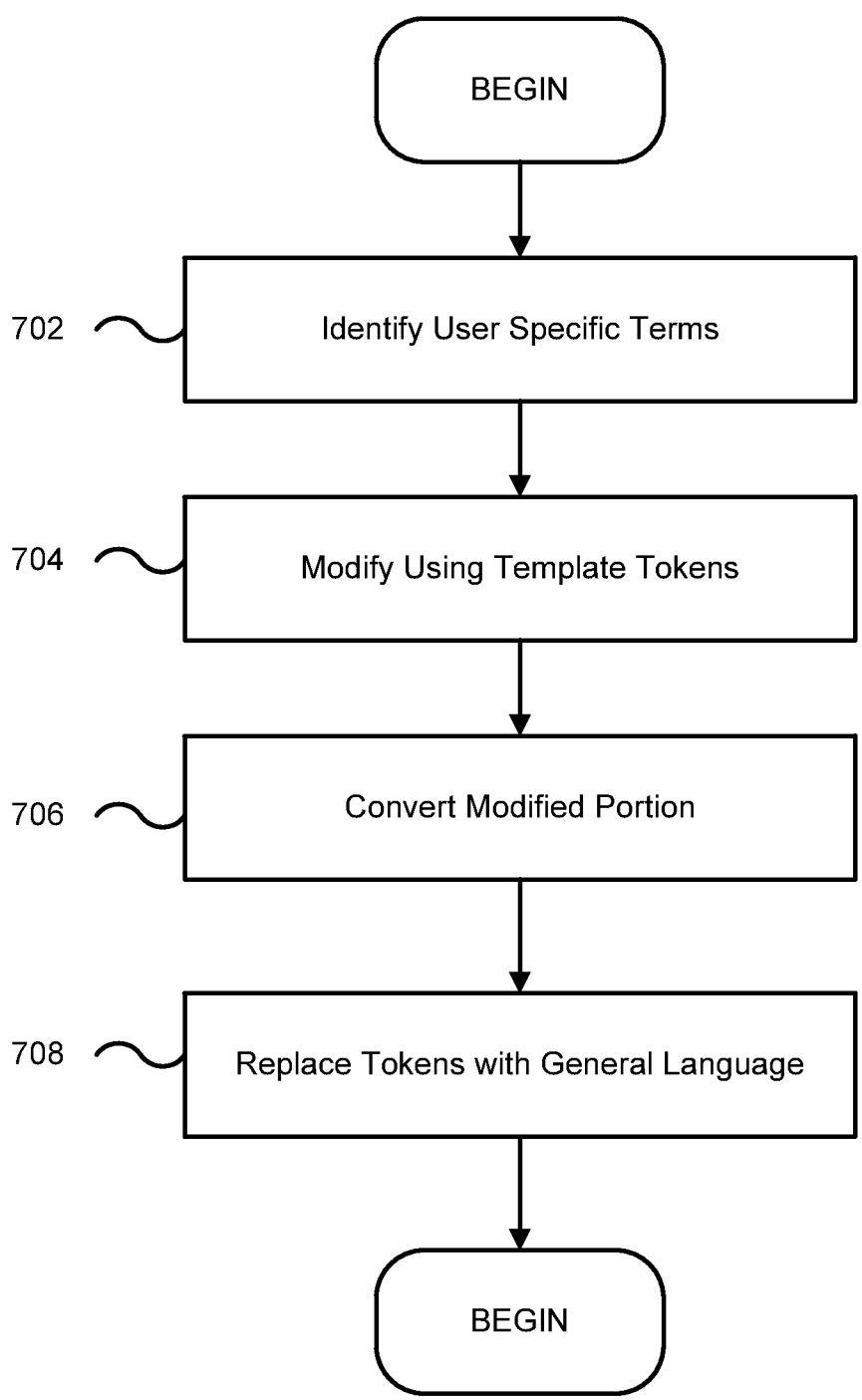
FIG. 7 is a schematic flow chart diagram illustrating one embodiment of a method in accordance with the present disclosure.

FIG. 7 is a schematic flow chart diagram illustrating one embodiment 700 of a method in accordance with the present disclosure. In one embodiment, the method 700 may begin and the hybrid language module 120 may identify 702 one or more user specific tokens in a user generated portion of text. The hybrid language module 120 may modify 704 the portion of text by replacing one or more user specific tokens with general tokens that are template tokens. The hybrid language module 120 may convert 706 the modified portion of text to one or more commands to be executed by an application. After converting the modified portion of text to one or more commands, the hybrid language module 120 may replace the template tokens with general language and the method may end. In one embodiment, replacing the template tokens with general language may allow a general language processor operating at the apparatus 100 to interpret the modified portion of text.

Figure 8:
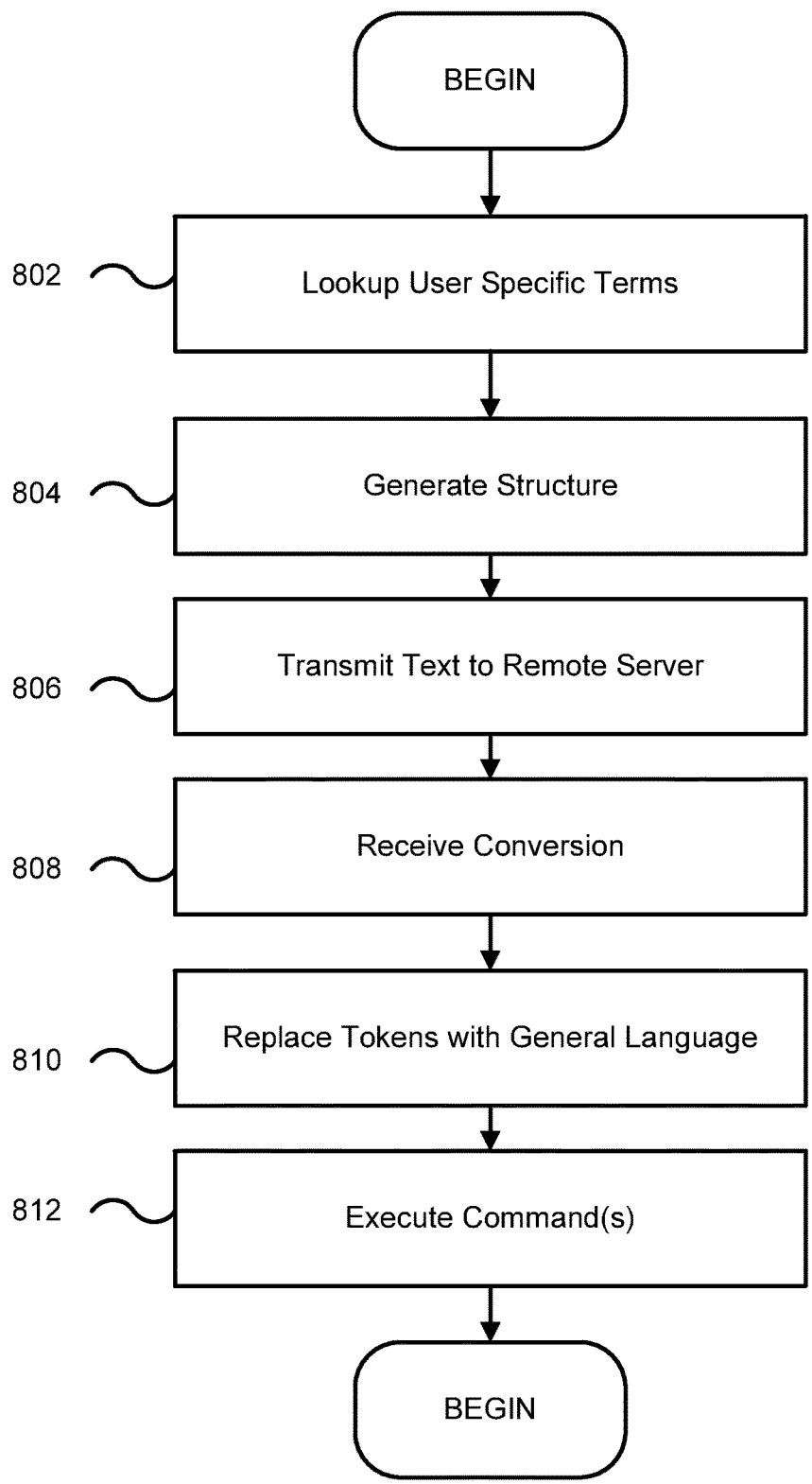
FIG. 8 is a schematic flow chart diagram illustrating one embodiment of a method in accordance with the present disclosure.

FIG. 8 is a schematic flow chart diagram illustrating one embodiment of a method in accordance with the present disclosure. In one embodiment 800 the method may begin and the hybrid language module 120 may identify one or more user specific terms by looking up 802 terms in a local library of terms. The hybrid language module 120 may modify the portion of text by replacing one or more of the user specific terms with template tokens. The hybrid language module 120 may generate 804 a structure to encapsulate modified portion of text and the user specific terms. The hybrid language module 120 may convert 806 the modified portion of text by transmitting the modified portion of text to a remote server for conversion. The hybrid language module 120 may received one or more commands from the remote server that are represented by the modified portion of text.

The one or more commands may include the template tokens. The hybrid language module 120 may replace the template tokens. The hybrid language module 120 may execute the commands and the method may end.

The wireless connection may be a mobile telephone network. The wireless connection may also employ a Wi-Fi network based on any one of the Institute of Electrical and Electronics Engineers (IEEE) 802.11 standards. Alternatively, the wireless connection may be a BLUETOOTH® connection. In addition the wireless connection may employ a Radio Frequency Identification (RFID) communication including RFID standards established by the International Organization for Standardization (ISO), the International Electrotechnical Commission (IEC), the American Society for Testing and Materials (ASTM), the DASH7 Alliance, and EPCGlobal.

Alternatively, the wireless connection may employ a ZigBee connection based on the IEEE 802 standard. In one embodiment, the wireless connection employs a Z-Wave connection as designed by Sigma Designs. Alternatively, the wireless connection may employ an ANT and/or ANT+ connection as defined by Dynastream Innovations Inc. of Cochrane, Canada.

The wireless connection may be an infrared connection including connections conforming at least to the Infrared Physical Layer Specification (IrPHY) as defined by the Infrared Data Association (IrDA). Alternatively, the wireless connection may be a cellular telephone network communication. All standards and/or connection types include the latest version and revision of the standard and/or connection type as of the filing date of this application.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
a processor;
a memory that stores code executable by the processor, the code comprising:
code that identifies one or more user specific terms in a user generated portion of text, wherein the one or more user specific terms each have a user specific meaning;
code that determines the user specific meaning corresponding to the one or more user specific terms, wherein the user specific meaning has a meaning local to the apparatus and stored on the apparatus, and the meaning local to the apparatus comprises a meaning found in a location selected from the group comprising a contact list, a browser, and a list of installed applications;
code that dynamically modifies the portion of text by replacing one or more of the user specific terms with general tokens as a direct result of the code identifying the one or more user specific terms in the user generated portion of text;
code that converts the modified portion of text using the user specific meaning corresponding to the one or more user specific terms to one or more commands to be executed by the processor as a direct result of the code dynamically modifying the portion of the text; and
code that executes the one or more commands in response to converting the modified portion.

2. The apparatus of claim 1, wherein the general tokens comprise template tokens.

3. The apparatus of claim 2, wherein the code that modifies further replaces the template tokens with general language.

4. The apparatus of claim 1, wherein the general tokens comprise general language.

5. The apparatus of claim 1, wherein the code further comprises code that generates a structure to encapsulate the modified text and the user specific terms, and code that transmits the structure to a remote server for conversion.

6. The apparatus of claim 1, wherein the code that identifies further identifies the one or more user specific terms by looking up the user specific terms in a local library.

7. A method comprising:
identifying, by use of a processor, one or more user specific terms in a user generated portion of text, wherein the one or more user specific terms each have a user specific meaning;
determining the user specific meaning corresponding to the one or more user specific terms, wherein the user specific meaning has a meaning local to an apparatus and stored on the apparatus, and the meaning local to the apparatus comprises a meaning found in a location selected from the group comprising a contact list, a browser, and a list of installed applications;
dynamically modifying the portion of text by replacing one or more of the user specific terms with general tokens as a direct result of identifying the one or more user specific terms in the user generated portion of text;
converting the modified portion of text using the user specific meaning corresponding to the one or more user specific terms to one or more commands to be executed by the processor as a direct result of dynamically modifying the portion of the text; and
executing the one or more commands in response to converting the modified portion.

8. The method of claim 7, wherein the general tokens comprise template tokens.

9. The method of claim 8, further comprising replacing the template tokens with general language.

10. The method of claim 7, wherein the general tokens comprise general language.

11. The method of claim 7, further comprising generating a structure to encapsulate the modified portion of text and the user specific terms.

12. The method of claim 7, wherein identifying the one or more user specific terms comprises looking up terms in a local library.

13. A program product comprising a non-transitory computer readable storage medium that stores code executable by a processor to perform:
   identifying one or more user specific terms in a user generated portion of text, wherein the one or more user specific terms each have a user specific meaning;
   determining the user specific meaning corresponding to the one or more user specific terms, wherein the user specific meaning has a meaning local to an apparatus and stored on the apparatus, and the meaning local to the apparatus comprises a meaning found in a location selected from the group comprising a contact list, a browser, and a list of installed applications;
   dynamically modifying the portion of text by replacing one or more of the user specific terms with general tokens as a direct result of identifying the one or more user specific terms in the user generated portion of text;
   converting the modified portion of text using the user specific meaning corresponding to the one or more user specific terms to one or more commands to be executed by the processor as a direct result of dynamically modifying the portion of the text; and
   executing the one or more commands in response to converting the modified portion.

14. The program product of claim 13, wherein the general tokens comprise template tokens.

15. The program product of claim 14, the code further replaces the template tokens with general language.

16. The program product of claim 13, wherein the general tokens comprise general language.

17. The program product of claim 13, wherein the code identifies the one or more user specific terms by looking up terms in a local library.

\* \* \* \* \*